(12) United States Patent
Abraham et al.

(10) Patent No.: US 6,623,158 B2
(45) Date of Patent: Sep. 23, 2003

(54) METHOD AND APPARATUS FOR THERMAL PROXIMITY IMAGING USING PULSED ENERGY

(75) Inventors: David W. Abraham, Croton-on-Hudson, NY (US); Timothy J. Chainer, Putnam Valley, NY (US); Philip L. Trouilloud, Norwood, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/882,651

(22) Filed: Jun. 15, 2001

(65) Prior Publication Data

US 2002/0191672 A1 Dec. 19, 2002

(51) Int. Cl.⁷ .......................... G01N 25/72; G01N 25/00
(52) U.S. Cl. ................................ 374/5; 374/7
(58) Field of Search .................................. 374/5, 6, 7

(56) References Cited

U.S. PATENT DOCUMENTS

| | | | | |
|---|---|---|---|---|
| 3,222,917 A | * | 12/1965 | Roth .............................. | 374/5 |
| 3,978,713 A | * | 9/1976 | Penney .......................... | 374/7 |
| 4,012,691 A | * | 3/1977 | Bartoli et al. ................... | 374/7 |
| 4,634,291 A | * | 1/1987 | Bantel et al. .................... | 374/7 |
| 5,527,110 A | | 6/1996 | Abraham et al. ............... | 374/5 |
| 5,753,803 A | | 5/1998 | Abraham et al. ............... | 73/104 |
| 5,806,978 A | | 9/1998 | Abraham et al. ............... | 374/1 |
| 5,810,477 A | * | 9/1998 | Abraham et al. ............... | 374/7 |
| 5,850,374 A | | 12/1998 | Abraham et al. ............... | 369/14 |
| 6,004,030 A | * | 12/1999 | Abraham et al. ............... | 374/1 |
| 6,033,107 A | * | 3/2000 | Farina et al. .................... | 374/5 |
| 6,071,007 A | * | 6/2000 | Schaenzer et al. ............. | 374/7 |
| 6,262,572 B1 | * | 7/2001 | Franco et al. ................... | 374/7 |
| 2002/0018508 A1 | * | 2/2002 | Sundaram et al. .............. | 374/7 |
| 2002/0027941 A1 | * | 3/2002 | Schlagheck et al. ............ | 374/5 |

* cited by examiner

Primary Examiner—Diego Gutierrez
Assistant Examiner—Mirellys Jagan
(74) Attorney, Agent, or Firm—Douglas W. Cameron, Esq.; John Pietrangelo; Heslin Rothenberg Farley & Mesiti P.C.

(57) ABSTRACT

A method and apparatus for mapping the character and location of small surface variations on a planar surface. Energy in the form of pulses is supplied to an object in close proximity to the planar surface to thereby raise the temperature of the object and at part of the surface. A change in temperature of the object is detected when it is in proximity to the variation to define the location and character of the variation. By supplying the energy in the form of pulses, the size of the thermal signature produced in the planar surface is limited wherein a more accurate and more sensitive mapping method and apparatus are provided. The energy supply may be thermal energy or optical energy but preferably is electrical energy which heats a resistive element. Preferably, the object is a magnetoresistive head of a disk drive assembly and the surface may be that of a magnetic recording material. The change in temperature is detected by monitoring the resistance of the magnetoresistive coil of the head. It is preferred that the object be positioned with respect to the surface so that when that relative motion between the surface and the object occurs, the object does not contact the surface.

31 Claims, 5 Drawing Sheets

METHOD AND APPARATUS FOR THERMAL PROXIMITY IMAGING USING PULSED ENERGY

CROSS-REFERENCE TO RELATED APPLICATIONS

This application is related to commonly assigned U.S. Pat. No. 5,527,110 entitled "Method and Apparatus for Detecting Asperities On Magnetic Disks Using Thermal Proximity Imaging," issued Jun. 18, 1996; and U.S. Pat. No. 5,806,978 entitled "Calibration Apparatus and Methods for a Thermal Proximity Sensor," issued Sep. 15, 1998. These United States Patents are hereby incorporated by reference herein in their entirety.

TECHNICAL FIELD

This invention relates generally to apparatus and methods used for the detection of topographical variations on a surface of a data storage medium using the thermal response of a sensor moving relative thereto. More particularly, the invention relates to apparatus and methods for enhancing the time and spatial resolution of the sensor used to detect the variations to more accurately locate and characterize variations on or in the surface.

BACKGROUND OF THE INVENTION

In data processing systems, magnetic disk drives and other media are often used as direct access storage devices. In such devices, read-write heads are used to write data on or read data from an adjacently rotating hard, flexible disk, tape, or other form of data storage media. In the following discussion, the term "disk" will be used almost exclusively, but it is to be understood that the discussion is not limited to disk-like media but all similar data-storage media are included.

Read-write heads typically travel over the surface of the disk at relatively high speeds and in close proximity to the surface of the disk. To prevent damage to either the disk or the read-write head, it has been recognized for a long time that the surface of the disk should be very flat and free of any bumps, asperities, or the like which might be contacted by the read-write head. Also, the read-write heads are typically designed so that they fly over the surface of the rotating disk at a very small, though theoretically constant distance above the disk, the separation between the read-write head and the disk being maintained by a film of air. During its flight, the head undergoes continuous vibration, pitch, and roll as the topography of the disk varies beneath the head. If the quality of the disk or the read-write head is poor, occasional rubbing or sharp contact may occur between the disk and the read-write head, leading to damage to the head or to the disk, or loss of valuable data, or all of these which are typically referred to as "head crashes".

Various attempts have been made to provide increased assurance that such undesirable contact between a read-write head and a recording disk does not occur. Rigid manufacturing and quality assurance specifications for both the recording disk and the read-write head have been developed to minimize or prevent such contact.

Disk inspection for various types of defects, including magnetic, optical and topographic defects (i.e., delamination, voids, inclusions, asperities, etc.), is of critical importance for the increasingly stringent production requirements facing a manufacturer today as smaller drives store more data and operate at higher speeds. Many methods of inspection to find defects are in use, and many more have been proposed. These include optical techniques (fiber interferometry, bulk optic shear interferometry, microISA), magnetic readout (simply screening, HRF, etc.,) and mechanical testing (for example, the PZT glide test). Each of these techniques may play a role in achieving the goal of the virtually defect-free production of magnetic disks. However, with a tightening market and more exacting technical requirements as heads fly lower and faster, less expensive and more accurate inspection schemes become more significant.

U.S. Pat. No. 4,747,698 to Wickramasinghe, et al. is directed to an inspection apparatus referred to as a Scanning Thermal Profiler. In the method using this apparatus, a fine scanning tip is heated to a steady state temperature at a location remote from the structure, for example, the surface, to be investigated. Thereupon, the scanning tip is moved to a position proximate to, but spaced from the structure. At the proximate position, the temperature variation from the steady state temperature is detected. The scanning tip is scanned across the surface structure with the aforesaid temperature variation maintained constant. Piezo-electric drivers move the scanning tip both transversely of, and parallel to, the surface structure. Feedback control assures the proper transverse positioning of the scanning tip and voltages thereby generated replicate the surface structure to be investigated. While this approach provides excellent height resolution, it requires the use of an expensive scanning tip. This technique also has the disadvantage that it cannot readily be utilized on an assembled disk drive.

Thermal Proximity Imaging (TPI) or Sensing (TPS) is a surface inspection technique by which topographical variations on the surface of a medium can be detected and characterized by monitoring the thermal response of a sensor in motion relative to the surface. Topographical variations may be asperities, projections, recesses, voids, particles, impurities, etc., or any other geometric or material deviation from a desired relatively smooth surface of relatively uniform composition which can produce a measurable change in the temperature of an object passing over the surface. As disclosed in the above-identified U.S. Pat. No. 5,527,110, a sensor, possibly a magnetoresistive (or MR) access element used to access data on a data storage medium, is heated using a known electrical current, or "bias current". The Joule-effect heat induced in the sensor by the bias current varies when topographical variations on the surface pass by the sensor during the relative movement between the sensor and the surface. Because the topographical variations vary the distance (that is, "height" or "gap") between the sensor and the surface, and because the heat transferred from the sensor varies as a function of this distance, measuring or monitoring the temperature change of the sensor is a useful technique for identifying the location and character of topographical variations on the medium. TPS is a very sensitive and reliable indicator of disk surface topography. TPS can serve as an imaging tool, defect detector, and a sensitive indicator of head dynamics. TPS has been shown to be a useful tool for "in situ" measurement of disk topography and for defect detection. It is a non-invasive technique. The sensitivity of the TPS method is in the sub-nanometer range for height, and the thermal response is in the MHz range for presently-existing head geometries and bias current arrangements.

However, existing TPS methods typically are inherently limited by the relatively large thermal signatures produced during Joule heating of the sensor. The area on the surface being examined which is heated during the heating of the sensor, for example, by a direct current power source, is typically much larger than the sensor itself. For example, a sensor having dimensions of about 0.1 microns×3 microns will typically heat an area of about 3 microns×6 microns on the surface being examined. This broad thermal footprint, or heat-effected zone, relative to the sensor, detracts from the accuracy with which topographical variations can be located. For example, a topographical variation effecting a change in the sensor temperature may be 1.5 microns or more away from the location of the sensor. Furthermore, the detection and locating of smaller variations within the thermal footprint may be obscured by the presence of larger variations that also lie within the footprint.

Thus, in using conventional TPS devices, the detection of small topographical variations and the locating of all topological variations can be hampered due to the broad thermal footprints typically produced in such systems. As a result, the sensitivity or resolution of the detection method suffers. Therefore, there is a need in the TPS art to provide methods and devices for limiting the dimensions of the area (or volume) heated by the Joule-heating of the sensor in order to improve the sensitivity of the TPS method.

In addition, in order to provide quantitatively accurate images of topographical variations on a surface over which a TPS sensor is to be moved, it is also desirable to provide TPS techniques which support sensors designed for non-invasive, in-situ measurement of topography in storage systems, and should therefore, preferably, not require any particular, non-standard use or manipulation of the surface itself.

SUMMARY OF THE INVENTION

The desired thermal proximity sensor techniques and devices are provided by the instant invention. One embodiment of this invention is, for example, a TPS technique (method and system) wherein the resolution of the detection of topographical variations on surfaces is improved by varying the heating of the sensor object. Limiting the energy provided to the sensor object, for example, by supplying the energy in the form of energy pulses of limited duration, that is, limited "on-time", limits the diffusion of heat to areas of the surface under investigation to the immediate vicinity of the sensor object. Thus, asperities located beyond the immediate vicinity of the sensor are less likely to influence the temperature of the sensor. This limiting of the thermal footprint of the TPS technique improves the sensitivity or resolution of the technique.

In addition to limiting the duration of the energy pulses provided to the sensor, in another embodiment of the invention, the time at which no energy is provided to the sensor object, that is, the time that no heating of the sensor object occurs, is optimized. By optimizing the time at which no heating occurs, that is, the "off-time", the temperature of the adjacent medium under investigation is allowed to decrease and limit the area (or volume) to which heat diffuses in the subsequent energy pulse. This, again, ensures that only topological variations in the immediate vicinity of the sensor object influence the temperature of the sensor object. As a result, the sensitivity of the detection method and the accuracy with which variations can be located are enhanced.

Another embodiment of the invention is, for example, a method for mapping the location of surface variations on a substantially planar surface comprising: moving a sensor object over the planar surface at a substantially constant height above the surface; supplying energy to said object to thereby raise the temperature of the object and heat at least part of the planar surface; varying the supply of energy to said object to thereby limit the size of the area heated on the planar surface; and detecting a change in temperature of said object when the object is in proximity to a surface variation to define the location of said surface variation. The step of varying the supply of energy is typical practiced by means of providing energy pulses to the sensor object. The pulses may typically have an "on-time" and an "off time".

A further embodiment of the invention is, for example, an apparatus for mapping the location of surface variations on a substantially planar surface having a measurement resolution, the apparatus comprising: a slider configured to slide at a substantially constant height over the planar surface; a sensor object carried by said slider in close proximity to said planar surface; an energy supply configured to supply energy to the said object to thereby raise its temperature, wherein said energy is supplied as energy pulses, and wherein said energy pulses are configured to generate heat pulses within said planar surface wherein the thermal diffusion dimension of said heat pulses in said planar surface is less than the measurement resolution; a detector configured to detect a change in temperature of said object when it is in proximity to a surface variation; and means for defining the location of the surface variation from the detected change in temperature of the object.

Still another embodiment of this invention is a method for mapping the location of surface variations of relatively small height on a substantially planar surface comprising the steps of: supplying energy to an object in close proximity to the planar surface to thereby raise the temperature of the object; moving the object with respect to the planar surface while keeping the object a substantially constant distance from the planar surface; and detecting a change in temperature of the object when the object is in proximity to a surface variation to define the location of the variation; wherein pulses of energy are supplied to the object to improve the resolution with which the location of the variation can be defined.

The on-time and off-time of the energy pulses may be constant or vary in duration. The on-time may be constant and the off-time vary, or the on-time may vary and the off-time be constant. In addition, the timing of the pulses may vary with respect to the relative position of the sensor object on the planar surface under examination. For example, the timing of the pulses my vary with respect to a fixed position on the planar surface.

The variable heating of the sensor is preferably practiced by means of varying electric current, though other forms of heating, for example, by laser, can also be used.

The methods and apparatus of the present invention provide means for detecting, locating, and characterizing topographical variations with improved spatial resolution compared to the prior art.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

BEST MODE FOR CARRYING OUT THE INVENTION

Figure 1:
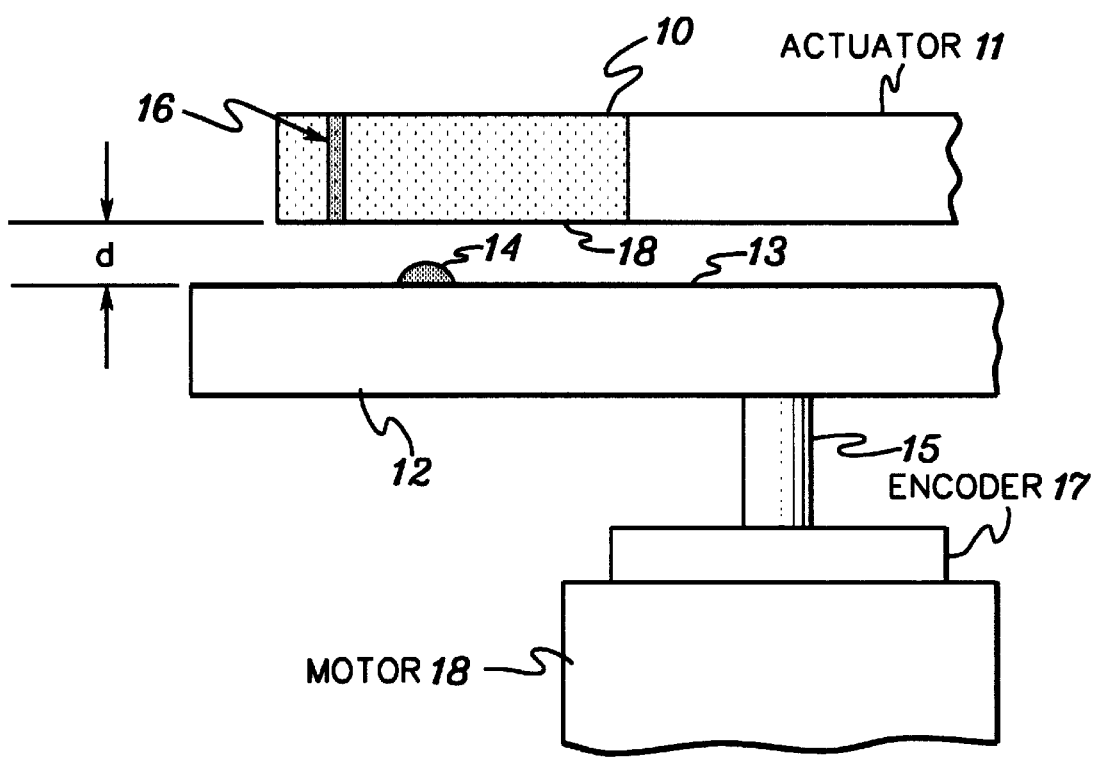
FIG. 1 is an enlarged, schematic view of an apparatus having a read-write head flying over a rotating disk, having an asperity thereon, that can be used to implement the present invention.

FIG. 1 illustrates a typical apparatus in which the present invention can be implemented. FIG. 1 includes a standard magnetoresistive (MR) head or slider 10 mounted on an actuator 11 used to detect disk asperities 14 on disk 12 by means of the Thermal Proximity Sensing (TPS)technique. The apparatus illustrated in FIG. 1 is typically found in a digital data storage device, for example, a hard disk drive in a digital computer system, though the present invention can be used for other data storage media or other applications where the detection of topographical variations on surfaces is desired. The relative geometry (for example, size and position) of the slider 10 with relation to the disk 12 and an asperity 14 is illustrated in FIG. 1. The upper surface 13 of disk 12 typically contains some form of media, for example, magnetic or optical, for storing data. According to the present invention, it is desired to improve the detection and locating of topographical variations (that is, defects, delaminations, voids, inclusions, asperities, dirt, debris, particles, and the like) on the surface 13. As is well known in the art, disk 12 rotates on a spindle 15, driven by a motor 18. An encoder 17 provides data on the relative rotational orientation of disk 12 with respect to slider 10. However, it is to be understood that the present invention is also applicable to systems in which the disk 12 is stationary and the slider 10 moves, or if the disk 12 and slider 10 both move.

Note that in the following discussion and throughout this application, the present invention is applicable to any TPS detection system where there is any type of relative motion between the access element or sensor 16 and the medium 12. This relative movement may be referred to herein as the medium 12 moving relative to the sensor 16 or to the sensor 16 moving relative to the medium 12. It will be apparent to those of skill in the art that this relative motion includes the case where the medium moves and the sensor is fixed, for example, when the medium 12 is a spinning disk, or a moving tape, and also the case where the medium 12 is stationary and the sensor 16 moves, or any combination thereof.

As is typical in the art, slider 10 includes an "air-bearing surface" 18 facing the upper surface 13 of disk 12. This air-bearing surface 18 can be specially designed so that the relative motion of the air-bearing surface 18 of slider 10 and the planar surface 13 of disk 12 maintains the distance, d, between the slider 10 and disk 12 substantially constant. The air-bearing surface 18 can be designed to provide a substantially constant fly height (for a given rotational disk speed) of slider 10 above the surface of disk 12.

In a typical TPS method, the temperature of head 10 is elevated using Joule heating of the MR element or sensor object 16. As the head passes over the disk it reaches some elevated temperature determined by the energy input, the geometry and thermal characteristics of the head and disk, and the ambient conditions, among other things. When a topographical variation 14 (for example, a particle) on the surface 13 causes the gap spacing, for example, to temporarily vary, the temperature of the sensor object 16 will vary (typically, drop). This variation in temperature is typically detected as a momentary spike in the head readout signal due to the non-zero temperature coefficient of resistance. The amplitude of the spike is, for example, proportional to the temperature differential maintained in the MR head versus the disk surface and to the thermal properties of the variation. The amplitude of the spike is typically proportional to 1/d where, again, d is the head-disk spacing (as opposed to the "average fly height").

In standard operation, the MR sensor object 16 can be expected to operate at an elevated temperature (for example, between about 50 degrees and 200 degrees C. above ambient temperature), since typical bias currents are on the order of 10 mA and head resistances are typically a few tens of ohms. Since this heat is localized to the region of the MR sensor, and since the sensor is of micron-scale size, the temperature rise can be expected to be significant, and in fact proportional to the square of the current. The temperature rise will be determined by this energy input, balanced by convective and/or conductive losses into the ambient atmosphere, the disk, adjacent hardware, and cooling air flow provided, among other things.

The size of the topographical variation (for example, particle, asperity, void, etc.) can be estimated from the strength of the thermal signal. The effectiveness of detecting variations in the sensor temperature (typically, cooling) depends on both the width and height of the variation, and during the scan past the variation a discernable amount of heat energy will flow to the disk surface.

Use of existing MR head technology has several advantages. First, no additional development need be done, and implementation in a test stand can be achieved with little extra cost. Second, a large knowledge base exists about MR head properties, so that complete understanding of thermal response versus magnetic properties can be had at small added effort. Third, no modification of the head is required, so that significant costs in replacement heads is avoided (as exists with the PZT glide tester described in U.S. Pat. No. 4,532,802). Fourth, topographic screens and magnetic evaluation can be performed nearly simultaneously (i.e., sequentially), which is important as a time saver, and for providing new information correlating the two properties. Fifth, this technique can provide higher resolution and less ambiguous information about asperities than piezo-based methods. Finally, the technique can be used to evaluate disks in assembled head-disk assemblies of disk drives. However, one disadvantage of existing TPS systems, as discussed above, is the relatively large thermal footprint produced by the typical energy input used to heat the sensor.

Figure 2:
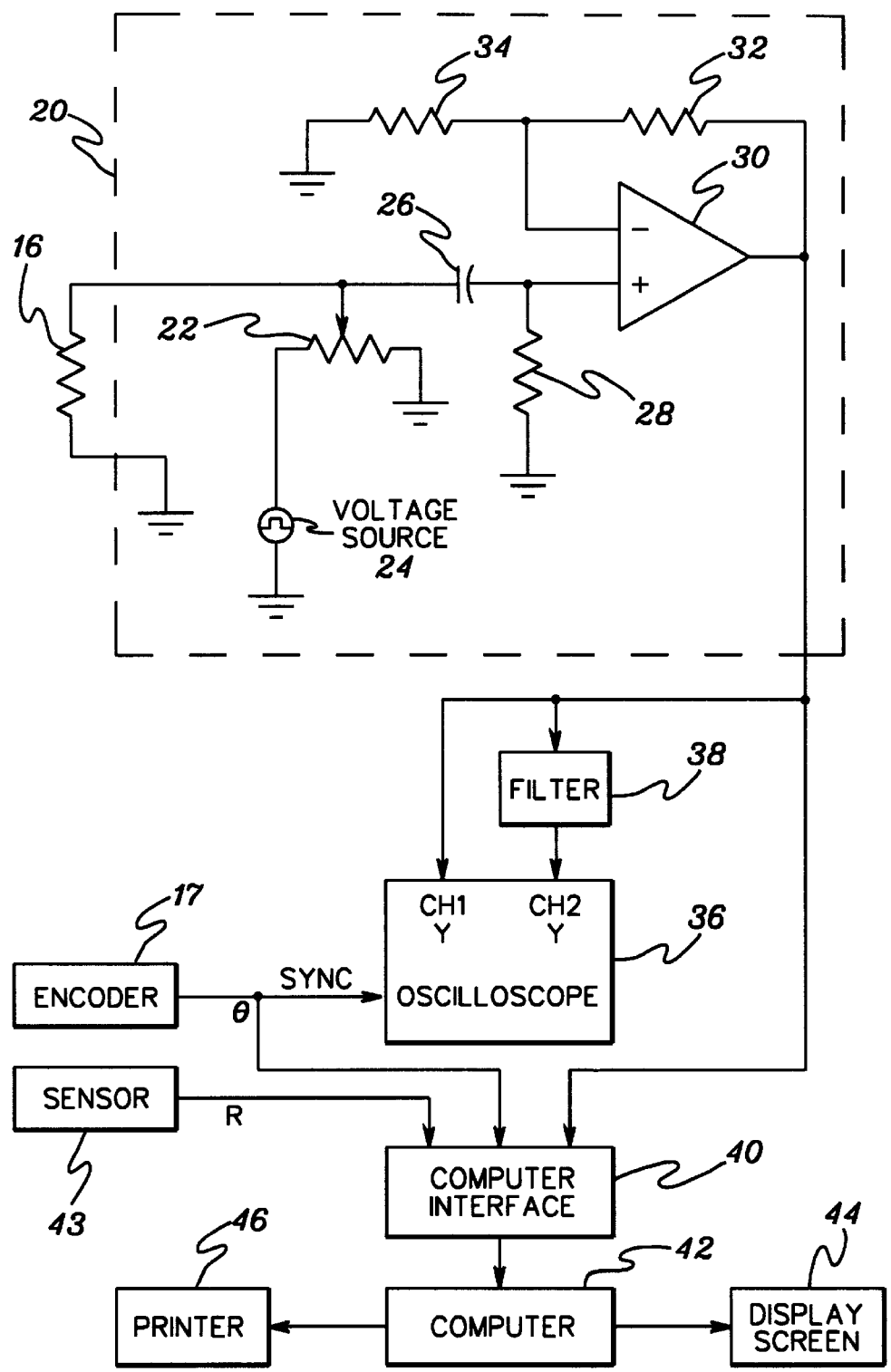
FIG. 2 is a diagram, partially schematic and partially in block, of an exemplary apparatus according to the invention.

FIG. 2 illustrates a system that can be used obtaining and evaluating data temperature variations of the slider 10 illustrated in FIG. 1 which incorporates the present invention, that is, the pulsed energy input to the sensor object 16. The system shown in FIG. 2 includes a pre-amplifier circuit 20 which, among other things, provides a bias current to the magnetic stripe (or sensor object) 16 of slider 10. A potentiometer 22 is connected to a voltage source 24 at one end and to ground at the other end and permits adjustment of the bias current. The potentiometer is connected to one side of MR sensor object 16 of slider 10. The other side of MR sensor object 16 is connected to ground. The voltage source 24 is also connected to ground.

Capacitor 26 and resistor 28 form a high pass filter which passes signals from the sensor object 16 to the non-inverting input of an operational amplifier 30. Resistor 32 connected from the output of the operational amplifier to the inverting input and resistor 34 connected from the inverting input to ground determine the gain of operational amplifier 30, in a manner well known in the art. Typically, resistors 32 and 34 are selected so that operational amplifier 30 has a gain of 500.

In order to monitor the temperature of the sensor object 16, output signals from amplifier 30 are provided as Y axis inputs to a first channel of an oscilloscope 36. The same signals are sent to a filter 38, for example, an envelope filter, and then to a Y axis input of a second channel of oscilloscope 36. The signals from a topographical variation on the disk are generally in the form of a sharp spike having a 3 dB width corresponding to a time of less than 50 microseconds, or typically less than 250 microns of disk travel. These spikes are displayed on the first channel of oscilloscope 36. The signals from the MR element due to magnetic data on disk 12 (FIG. 1), which typically change amplitude much more rapidly, pass through filter 38 and may also be viewed on the second channel of the oscilloscope 36.

The signals from amplifier 30 are also supplied to a computer interface 40 which includes an analog-to-digital converter, of a type well known in the art, which converts the analog signals from operational amplifier 30 to digital form, for acquisition by a computer 42.

Information concerning the rotational position of the slider 10 with respect to the disk, provided by shaft encoder 17, which may provide a pulse for every revolution of disk 12, is used as a synchronization input to oscilloscope 36. The detailed circumferential data from the encoder 17 may be used as a O-position input. It is therefore supplied to computer interface 40 for eventual use by computer 42. The position of slider 10 in the radial direction, R, with respect to disk 12 is determined by a head position sensor 43 associated with the actuator 11. This radial position information is also supplied to computer interface 40.

The information supplied to computer interface 40 provides three dimensional data where the angular (that is, θ) position and radial position data define the position of a topographical variation on the disk 12, while the information derived from the output of amplifier 30 provides an indication concerning the severity of the topographical variation, with respect to height. The information is stored in a data base in computer 42, processed by suitable processing techniques and finally displayed on a display screen 44. For example, according to the present invention, the data introduced to computer 42 can be manipulated by an appropriate algorithm to define a defect map of surface 13 that can be displayed on screen 44. This algorithm may include the input of user defined parameters, for example, a minimum temperature variation threshold, to aid in interpreting the data. Alternatively, a hard copy print out can be provided by a printer 46.

According to one embodiment of the present invention, voltage source 24 of the system shown in FIG. 2 provides pulses of electrical energy, having one polarity or alternating polarities, to the potentiometer 22 and to the sensor object 16. As discussed above, by providing the energy used to heat sensor object 16 in the form of pulses, a smaller, more localized, thermal footprint is produced on the surface of disk 12. Providing a smaller thermal footprint produces a TPS system which is more sensitive to smaller topographical variations and locates the variations more accurately.

Figure 3:
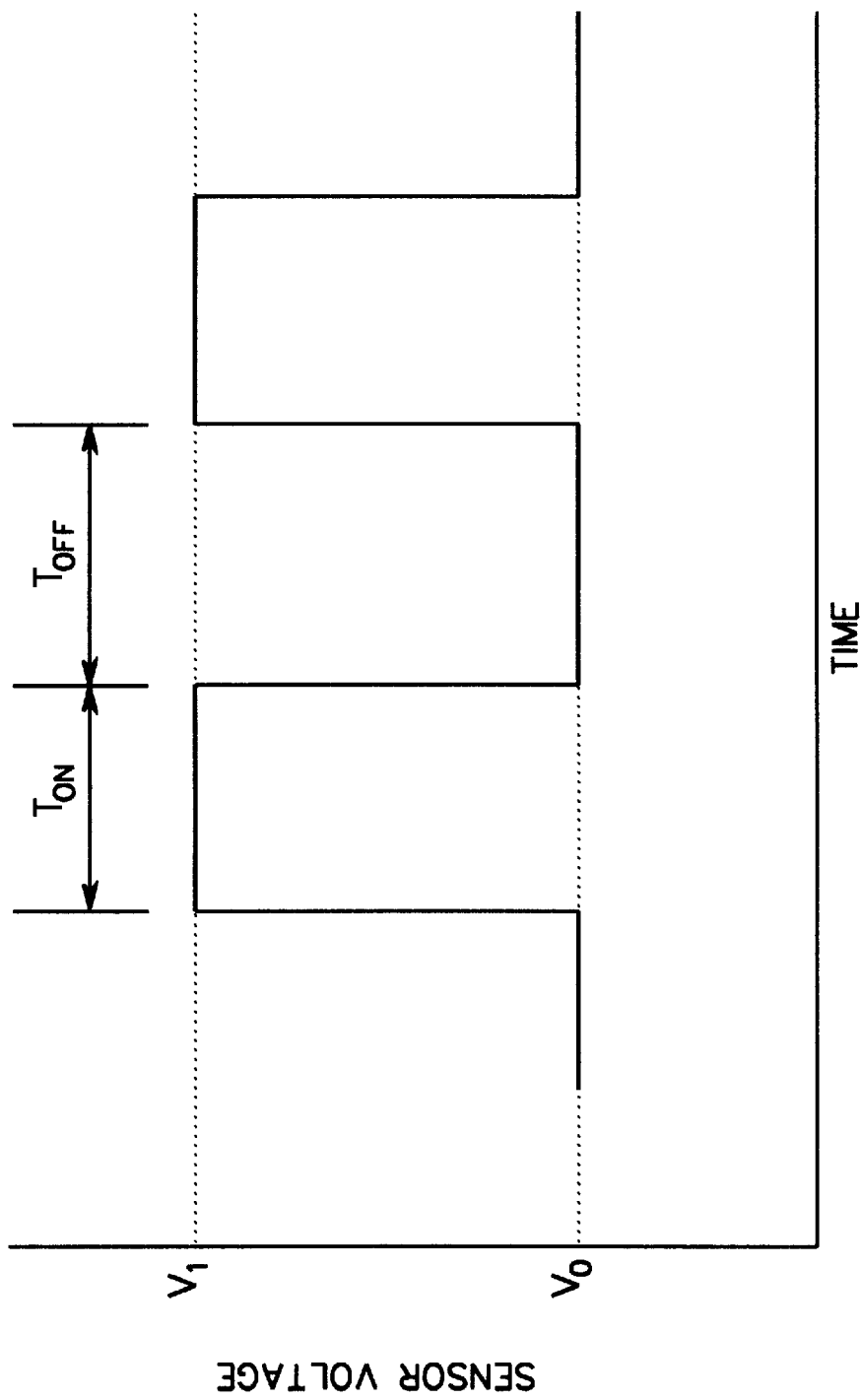
FIG. 3 is an illustration of an exemplary pulsed sensor voltage as a function of time according to the present invention.

A typical pulsed electrical signal that can be provided by source 24 according to the present invention is shown in FIG. 3. FIG. 3 shows an exemplary voltage pulse provided across the sensor object 16 as a function of time. For ease of illustration, FIG. 3 illustrates a voltage pulse as a simple square wave. However, according to the present invention, the voltage pulse may take any wave form which provides the desired heating and then cooling of the sensor object to effect the desired temperature profile. Thus, the voltage wave form according to the present invention may also be, for example, sinusoidal, triangular, saw tooth, or any other synthesized wave form.

In the exemplary wave form shown in FIG. 3, the lower voltage, V0, is typically about 0 volts DC, while the upper voltage V1 is typically about 0.2 volts DC, corresponding to a head current of about 10 mA. The duration at which voltage V1 is applied, that is, $t_{on}$, is typically from about 1 to about 1000 nanoseconds (that is, 1 microsecond), but is preferably between about 3 and 300 nanoseconds. The duration for which the voltage is off, that is, $t_{off}$, is typically a function of $t_{on}$ and is typically expressed as a ratio of $t_{off}/t_{on}$. According to the present invention, the ratio $t_{off}/t_{on}$ typically ranges from about 1 to about 10, and the ratio is preferably between about 2 and about 4.

Figure 4A:
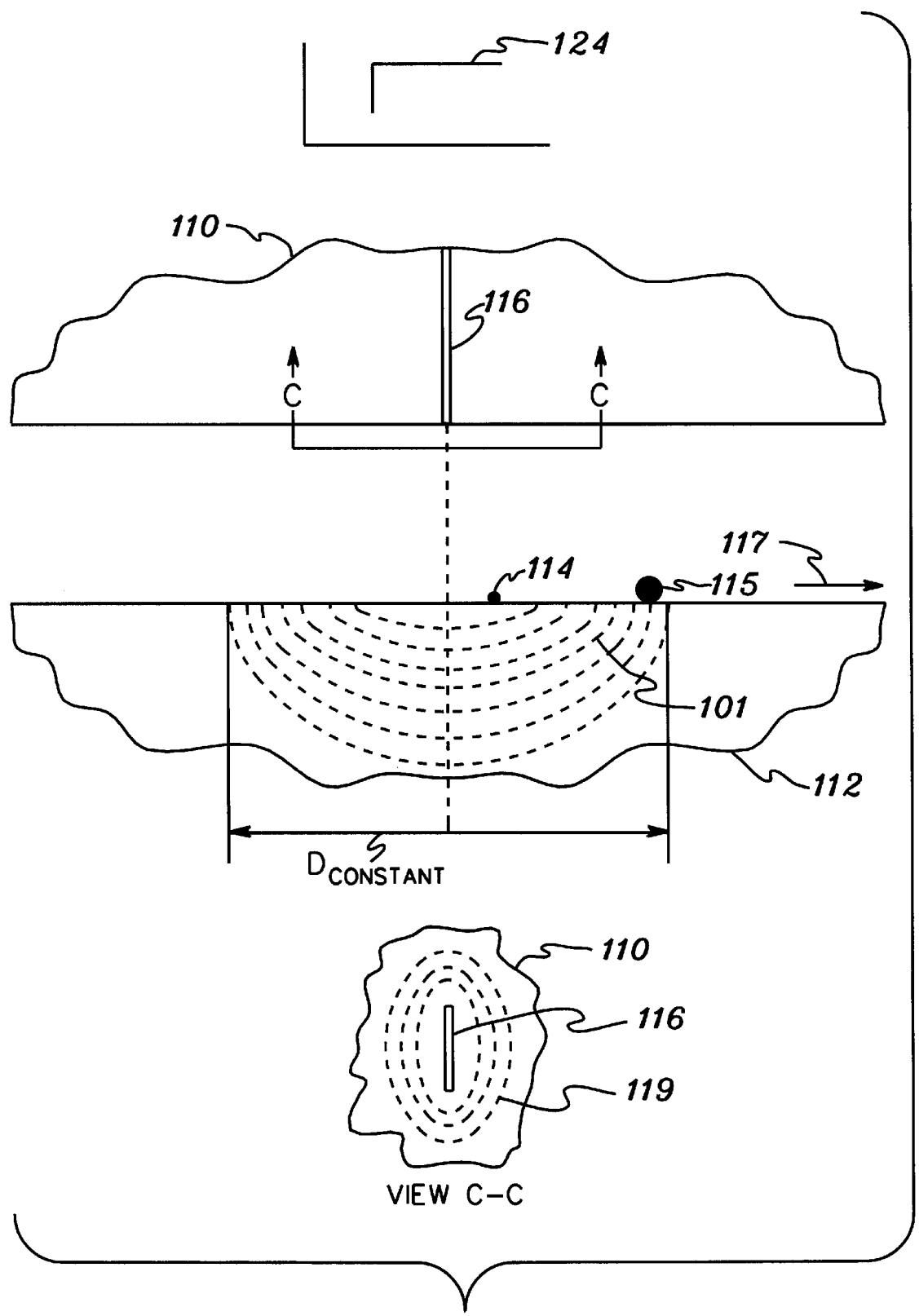
FIG. 4A is an enlarged, schematic view of the exemplary thermal signature of an apparatus having a read-write head flying over a rotating disk employing thermal proximity sensing according to the prior art.
Figure 4B:
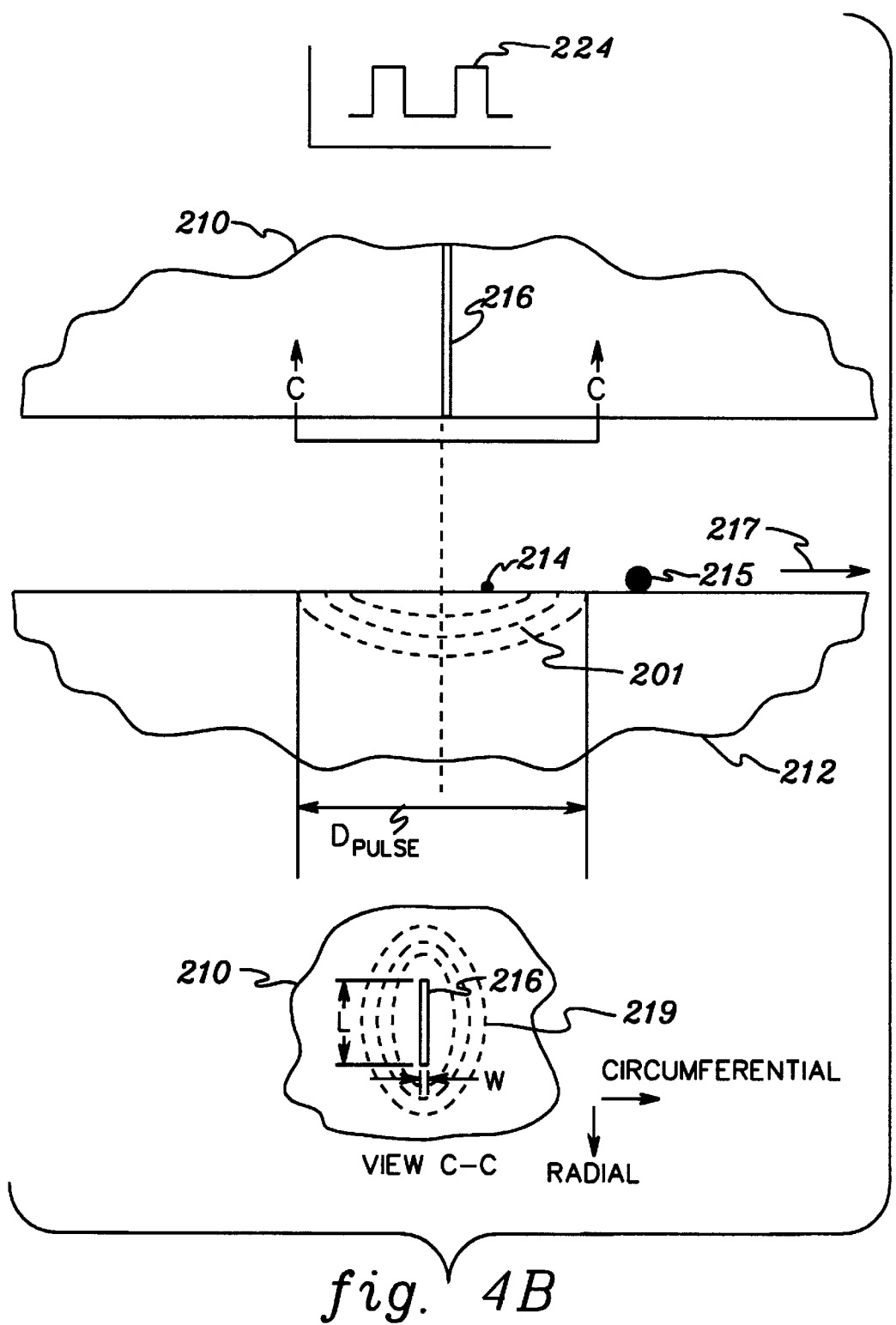
FIG. 4B is an enlarged, schematic view of the typical thermal signature of an apparatus similar to that shown in FIG. 4A, but employing pulsed energy input of the present invention.

The benefit of applying pulsed electrical energy to the sensor object compared to a non-pulsed or-continuous voltage to the sensor object 16 is illustrated in FIGS. 4A and 4B. FIG. 4A illustrates a representative thermal signature 101 produced in disk 112 during the heating of sensor object 116, mounted on slider 110, by a relatively constant voltage having profile 124, according to the prior art. Though according to the present invention, the sensor object 116 or the disk 112 or both the object and the disk may move relative to each other, in FIG. 4A, sensor object 116 is stationary and disk 112 moves (for example, spins) relative to object 116 in a direction indicated by arrow 117. Also shown in FIG. 4A are two topographical variations (for example, particles) 114, 115 in the vicinity of sensor object 116. In the example shown, variation 115 is larger than variation 114. As is characteristic of the prior art, during the heating of sensor object 116, a thermal signature or "thermal footprint" 101 is produced in the disk 112 in the vicinity of the sensor object 116 having a dimension (that is, diameter, length, or width) of $D_{constant}$. Also, shown in FIG. 4A is view C—C of sensor object 116 from beneath slider 110. View C—C illustrates a typical temperature gradient 119 about the sensor object 116. As shown in FIG. 4A, the thermal signature of the prior art TPS system having a dimension $D_{constant}$, can extend well beyond the immediate vicinity of the sensor object 116. As a result, in the prior art systems, the temperature of the sensor object 116 can be influenced by any and all topographical variations lying within the dimension $D_{constant}$. Not only is the accuracy with which such variations, such as 114 and 115, hampered by such a large thermal signature,-but, for example, the presence of one variation, such as variation 114, can be obscured by the presence of other variations, such as variation 115. For example, the temperature variation produced by a larger particle 115 further away from the object 116 may obscure or obliterate any temperature variation produced by smaller particle 114 lying closer to the sensor object 116.

The characteristics of the present invention, which addresses the limitations of the prior art, are illustrated schematically in FIG. 4B. FIG. 4B illustrates a slider 210 (similar to slider 10 and 110), sensor object 216 (similar to objects 16 and 116) mounted on slider 210, and a segment of disk 212 (similar to disks 12 and 112) in the vicinity of slider object 216 in which the topographical variations 214 and 215 are located. In FIG. 4B disk 212 moves in the direction indicated by arrow 217. Also, shown in FIG. 4B is view C—C of sensor object 216 from beneath slider 210. View C—C illustrates a typical temperature gradient 219 about the sensor object 216. According to the present invention, by applying a varying voltage having a pulsed profile 224 (that is, a voltage profile as illustrated, for example, in FIG. 3.) a more sensitive and accurate TPS technique is provided. According to the present invention, the voltage profile 224, which heats the object 216 for a limited time, limits the dimension (that is, the diameter, length, or width), $D_{pulse}$, of the thermal signature 201 to a smaller dimension, for example, smaller than the dimension $D_{constant}$. For example, where in the prior art system of FIG. 4A the dimension of the thermal signature, $D_{constant}$, is typically at least 9 microns, in the system according to the present invention, the dimension of the thermal signature, $D_{pulse}$, can be less than 1 micron, for example, the present invention can provide a resolution as small as 0.3 microns, or even 0.1 microns. As a result, the region of the disk 212 which influences the temperature of sensor object 216 is limited to the region having a dimension $D_{pulse}$. In the example shown, the dimension $D_{pulse}$ of the thermal footprint 210 is limited to the vicinity of sensor object 216 and, for example, does not encompass the particle 215. As a result, according to the present invention, the temperature of sensor object 216 is affected by the particle 214 and not by the larger, more distant object 215. Thus, object 214 (and particle 215) can be more accurately detected and located using the present invention than prior art techniques.

According to the present invention, the "pulse on" time, $t_{on}$, is chosen such that the thermal diffusion length (or width or diameter) $D_{pulse}$ is less than the desired resolution of the TPS system. For example, as shown in FIG. 4B, $t_{on}$ is chosen such that the diffusion length $D_{pulse}$ is smaller than the distance from the sensor object 216 to the large particle 215. As a result, the TPS system having such a smaller diffusion length $D_{pulse}$ will have a higher resolution and more likely be able to detect and more accurately locate the smaller particle 214. For example, according to the present invention, a TPS system-can have a resolution as fine as 1 micron, typically, as fine as 0.3 microns, or even 0.1 microns. That is, much finer than can be achieved with the systems according to the prior art.

It is understood by those of skill in the art that due to the geometry of conventional sensor objects (for example, object 216 in FIG. 4B), the radial resolution of a TPS system is defined by the dimension of the object in the radial direction, that is, for the object 216 shown in view C—C of FIG. 4B, the radial resolution is defined by the length (L). Typically, having a length L with an associated thermal footprint having a dimension of typically at least length L, little improvement in resolution in the direction of the length L, that is, in the radial direction is typically possible. According to the conventional art, the length (L) of a sensor object is orders of magnitude larger than the width (W), for example, the length L in the radial direction is typically measured in microns, where the width W in the circumferential direction is typically measured in Angstroms. According to the present invention, an increase in resolution of the TPS system typically refers to an increase in resolution in the direction of the width W, that is, in the circumferential direction, though some increase in resolution in the radial direction may be provided. For example, for the sensor object 216 of view C—C of FIG. 4B in which the relative movement of disk 212 is in the direction of arrow 217, a resolution or an improvement in resolution of the TPS system of the present invention is a resolution or an improvement in resolution in the circumferential direction, that is, in the direction of arrow 217. Thus, a resolution of 1 micron as discussed in this specification typically refers to a resolution in the circumferential direction of disk 212.

In addition, according to the invention, the "pulse off" time, $t_{off}$, is chosen to be long enough so that the heat pulse generated in the surface of disk 212 of FIG. 4b has essentially dissipated or diffused away from the area (or volume) about the sensor object 216. According to the invention, $t_{off}$, is typically at least twice $t_{on}$, but is preferably at least 3 times $t_{on}$, or even greater. Again, though $t_{on}$ and $t_{off}$ may be constant, they typically vary during the TPS process. In a typical embodiment, the character and location of the topographic variations is typically determined from a series of passes over the surface of disk 12, 112, 212. The number of rotations may be a function of the ratio of $t_{off}$ to $t_{on}$, for example, the number of rotations used to form a complete image of the topographic variation may be equal to the ratio of $t_{off}$ to Typically, the pulse timing, $t_{on}$ and $t_{off}$ (together or individually) are varied as a function of the position of the object 216 on the disk 212, for example, the timing may be varied as a function of position of object 16 relative to a fixed position on the disk 212.

The methods and apparatus of the present invention provide improved means for detecting, locating, and characterizing topographical variations on surfaces, for example, magnetic media, compared to the prior art. By controlling the heating of the sensor object during thermal proximity sensing and thereby limiting the area heated on the surface being examined, according to the present invention, the resolution with which topographical variations can be detected, located, and characterized is enhanced.

According to the present invention, the mode of detection using energy pulses may also only be used intermittently, for example, in a high-resolution mode of operation. That is, the increased resolution provided by the present invention may be used in conjunction with conventional, lower resolution, non-pulsed modes. For instance, the increased resolution of the present invention may be used as a "zooming in" feature to investigate areas of interest, for example, areas on surfaces displaying thermal anomalies or asperities when scanned using conventional non-pulsed methods.

While the invention has been particularly shown and described with reference to preferred embodiment(s) thereof, it will be understood by those skilled in the art that various changes in form and details may be made therein without departing from the spirit and scope of the invention.

What is claimed is:

1. A method for mapping the location of surface variations on a substantially planar surface comprising:
   moving a sensor object over the planar surface at a substantially constant height above the surface;
   supplying energy to said object to thereby raise the temperature of the object and heat at least part of the planar surface;
   varying the supply of energy to said object to thereby limit the size of the area heated on the planar surface; and
   detecting a change in temperature of said object when the object is in proximity to a surface variation in order to define the location of said surface variation.

2. The method of claim 1 wherein said location comprises a distance between the object and the surface variation.

3. The method of claim 1 wherein electrical energy is supplied to said object in said supplying energy step.

4. The method of claim 1 wherein the change in temperature of said object is detected by monitoring the resistance of the sensor object.

5. The method of claim 1 wherein the object is mounted on a slider and said slider has an air bearing surface, and relative motion of the air bearing surface and the planar surface maintains said slider at a substantially constant fly height above said planer surface.

6. The method of claim 1 further comprising acquiring data concerning the location of said variations on said surface, and creating a display of temperature variation of the object as a function of location.

7. The method of claim 1 wherein said surface is a surface of a magnetic storage medium, and said variations are asperities on said surface.

8. The method of claim 1 wherein said sensor object is a magnetoresistive sensor.

9. The method of claim 8 wherein the energy is electrical energy which is supplied to the magnetoresistive sensor.

10. The method of claim 1 wherein varying the supply of energy is practiced by means of supplying energy pulses.

11. The method of claim 10 wherein the energy pulses have an off time wherein the temperature of the sensor object is reduced to an acceptably low value during said off time.

12. The method of claim 10 further comprising varying the timing of the pulses with respect to a fixed position on the planar surface.

13. An apparatus for mapping the location of surface variations on a substantially planar surface, said apparatus having a measurement resolution, and said apparatus comprising:

a slider configured to slide at a substantially constant height over the planar surface;

a sensor object carried by said slider in close proximity to said planar surface;

an energy supply configured to supply energy to the said object to thereby raise its temperature, wherein said energy is supplied as energy pulses, and wherein said energy pulses are configured to generate heat pulses within said planar surface wherein the thermal diffusion dimension of said heat pulses in said planar surface is less than the measurement resolution;

a detector configured to detect a change in temperature of said object when said object is in proximity to a surface variation; and means for defining the location of the surface variation from the detected change in temperature of the object.

14. An apparatus as in claim 13 wherein the measurement resolution is 1 micron.

15. An apparatus as in claim 13 wherein the thermal diffusion dimension of said heat pulses is less than 1 micron.

16. An apparatus as in claim 13 wherein said energy pulses are one of electrical energy pulses, thermal energy pulses, and optical energy pulses.

17. An apparatus as in claim 13 wherein said slider is a magnetoresistive head of a disk drive assembly and said sensor object is a magnetoresistive sensor in said head.

18. An apparatus as in claim 13 wherein said surface is a surface of a magnetic storage medium, and said variations are asperities on said surface.

19. An apparatus as in claim 13 wherein said energy pulses have an on time and an off time.

20. An apparatus as in claim 19 wherein at least one of said on time and said off time varies.

21. An apparatus as in claim 19 wherein at least one of said on time and said off time is constant.

22. A method for mapping the location of surface variations of relatively small height on a substantially planar surface comprising the steps of:

supplying energy to an object in close proximity to the planar surface to thereby raise the temperature of the object;

moving the object with respect to the planar surface while keeping the object a substantially constant distance from the planar surface; and detecting a change in temperature of the object when it is in proximity to a surface variation to define the location of the variation;

wherein pulses of energy are supplied to the object to improve the resolution with which the location of the variation can be defined.

23. The method of claim 22 wherein the energy pulses have an off time wherein the temperature of the sensor object is reduced to an acceptably low value during said off time.

24. The method of claim 22 further comprising varying the timing of the pulses with respect to a fixed position on the planar surface.

25. The method of claim 22 wherein electrical energy is supplied to said object in said supplying energy step.

26. The method of claim 22 wherein said object comprises an air bearing surface, and relative motion of the air bearing surface and the planar surface maintains said object at a substantially constant fly height above said planar surface.

27. The method of claim 22 further comprising acquiring data concerning the location of said variations on said surface, and creating a display of temperature variation of the object as a function of location.

28. The method of claim 22 wherein said surface is a surface of a magnetic storage medium, and said variations are asperities on said surface.

29. The method of claim 22 wherein said object comprises a magnetoresistive head of a disk drive assembly having a magnetoresistive sensor.

30. The method of claim 29, wherein the energy comprises electrical energy which is supplied to the magnetoresistive sensor of the magnetoresistive head.

31. The method of claim 29 wherein the change in temperature of said object is detected by monitoring the resistance of the magnetoresistive sensor.

* * * * *

UNITED STATES PATENT AND TRADEMARK OFFICE
CERTIFICATE OF CORRECTION

PATENT NO. : 6,623,158 B2  Page 1 of 1
DATED : September 23, 2003
INVENTOR(S) : Abraham et al.

It is certified that error appears in the above-identified patent and that said Letters Patent is hereby corrected as shown below:

Column 10,
Line 20, insert -- $t_{on}$. -- at the end of the sentence

Signed and Sealed this

Sixth Day of January, 2004

JAMES E. ROGAN
*Director of the United States Patent and Trademark Office*